US006241559B1

(12) United States Patent
Taylor

(10) Patent No.: US 6,241,559 B1
(45) Date of Patent: *Jun. 5, 2001

(54) CORDLESS ELECTRICAL APPLIANCES AND CONNECTORS THEREFOR

(75) Inventor: John Crawshaw Taylor, Castletown (GB)

(73) Assignee: Strix Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/394,257

(22) Filed: Sep. 10, 1999

Related U.S. Application Data

(63) Continuation of application No. 08/617,856, filed as application No. PCT/GB94/02010 on Sep. 15, 1994, now Pat. No. 5,971,810.

(30) Foreign Application Priority Data

Sep. 16, 1993 (GB) .................................................. 9319159

(51) Int. Cl.[7] .................................................. H01R 24/02
(52) U.S. Cl. ............................................................ 439/675
(58) Field of Search ..................................... 439/675, 580, 439/63, 11, 924.1

(56) References Cited

U.S. PATENT DOCUMENTS

| 2,466,499 | 4/1949 | Sokolik ................................ 173/324 |
| 2,863,037 | 12/1958 | Johnstone . |
| 3,398,260 | 8/1968 | Martens ................................ 219/247 |
| 4,519,666 | 5/1985 | Williams et al. ................. 339/177 R |
| 4,759,729 | 7/1988 | Kemppainen et al. .............. 439/580 |
| 4,767,337 | 8/1988 | Kawasaki et al. ................ 439/924.1 |
| 4,799,902 | 1/1989 | Laudig et al. ....................... 439/580 |
| 4,812,623 | 3/1989 | Haden et al. ........................ 219/437 |
| 4,849,944 | 7/1989 | Matsushita ........................ 439/924.1 |
| 4,867,690 | 9/1989 | Thumma ............................ 439/924.1 |

FOREIGN PATENT DOCUMENTS

| 0 342 050 B1 | 8/1995 | (EP) . |
| 2 178 910 | 2/1987 | (GB) . |
| 2 181 598 | 4/1987 | (GB) . |
| 2 208 336 | 3/1989 | (GB) . |
| 2 221 104 | 1/1990 | (GB) . |
| 682384 | 8/1980 | (TW) . |
| WO 92/05604 | 2/1992 | (WO) . |

Primary Examiner—Gary F. Paumen
(74) Attorney, Agent, or Firm—Testa, Hurwitz & Thibeault, LLP

(57) ABSTRACT

A male connector and mating female connector for use in a cordless electric water heater jug. The male connector has a cup-shaped body with an open base within which are located a central pin terminal and two concentric annular terminals. The body of the female connector is dimensioned to fit within the male connector and has openings to receive the pin and inner annular terminal so that they may engage two female terminals. A further female terminal projects from the side wall of the female connector for engagement with the outer annular male terminal.

13 Claims, 5 Drawing Sheets

CORDLESS ELECTRICAL APPLIANCES AND CONNECTORS THEREFOR

RELATED APPLICATIONS

This application is a continuation of U.S. Ser. No. 08/617,856, filed Jul. 15, 1996, now U.S. Pat. No. 5,971,810 issued Oct. 26, 1999, which is a national stage application of International Application no. PCT/GB94/02010, filed Sep. 15, 1994, which claims priority to Great Britain application no. 9319159.1, filed Sep. 16, 1993.

The present invention relates to cordless electrical appliances and electrical connectors therefor, and in particular to cordless hot water containers such as jugs or kettles.

A cordless hot water jug comprises a jug containing an electrical immersion heater and which is placeable, in use, on a free-standing base unit which is connected to a power supply. An electrical connector is provided between the jug and the base unit such that when the jug is placed on the base unit, electrical connection is made between the immersion heater and the power supply. In most known cordless jug arrangements, the immersion heater and its associated control unit (usually including a "switch-on-dry" protector switch means and a steam sensitive switch means respectively operable to disable the heater in an overheat condition and on boiling) are mounted in a side wall of the jug adjacent the bottom of the vessel, as is also the case in traditional corded kettles. The electrical connection between the jug and the base unit is provided adjacent the control unit, to the rear of the vessel. In certain arrangements, terminal pins of the control unit extending horizontally from the control unit engage directly with a socket connector provided in an upstand at a peripheral part of the base unit. An example of such an arrangement is shown in WO 92/05604. In other arrangements, such as shown in GB 2221104, vertically extending pins mounted to the terminal pins of the control unit engage in a socket connector, again provided at a peripheral part of the base unit.

In other configurations, however, such as disclosed in GB 2178910 the immersion heater and control unit are mounted in the base wall of the jug, with terminal pins of the control unit engaging in a socket connector provided generally centrally of the base unit. Such arrangements have the advantage of giving a better engagement of the jug with the base unit since the connector is arranged closer to the centre of gravity of the jug but they do have certain disadvantages. Firstly it is no longer possible to use a standard heating element, which adds to the cost of the jug. Further, the control unit used in such an arrangement is not capable of being used in traditional corded kettles and jugs. Finally, because both a control unit and a connector are arranged in a compartment under a false jug base, the capacity of the jug relative to its height is significantly reduced.

According to a first aspect of the present invention there is provided a cordless hot water jug having an electric immersion heater and an associated control unit mounted to a side wall of the jug, adjacent the bottom of the jug, and a base unit for receiving said jug, said jug having a first connector arranged on the underside its base for engagement with a complementary second connector provided on the base unit, and electrical connection means connecting the first connector and the control unit of the heater.

Thus in accordance with this aspect of the invention, a connector is provided in the base of the jug for engagement with a connector in the base unit, and which is connected, for example by wires running along the base of the jug, to an immersion heater and control unit mounted in the traditional position in the side wall of the vessel. This arrangement gives the advantage of a base-located connector while avoiding largely the previously described disadvantages in that it is possible to use a standard control and heater, which keeps the cost of the jug down, and also minimises the room taken up beneath the base of the jug.

Conveniently the first connector is arranged within a shallow chamber formed beneath the floor of the vessel, the second connector extending upwardly from the base unit, to engage therewith.

Preferably the connector provided on the jug is arranged generally centrally of the jug base, and the base unit connector is arranged generally centrally on the base unit. This not only gives the best 'feel' when engaging the jug with the base unit, but is also advantageous in that it also facilitates the incorporation of a further preferred feature of the invention, namely that the connectors provided on the jug and base unit are such that they may be engaged with each other irrespective of their relative rotational orientation. This feature allows the jug to be placed down on the base unit in any rotational position, so that a user does not have to pay close attention as to the correct rotational orientation of the vessel and base, as is the case with known arrangements. It will be appreciated that this arrangement is applicable to other forms of cordless appliance.

This arrangement is in itself a departure from known constructions, and from a second aspect the invention provides a cordless appliance and a base unit for receiving the appliance, the appliance and the base unit having respective electrical connectors which can engage with each other irrespective of the relative angular orientation of the appliance and base unit wherein the connector associated with the appliance comprises a first terminal in the form of a pin and a second terminal in the form of an annulus disposed around the first terminal, the base unit comprising terminals for co-operation with the first and second terminals to supply electrical energy to the appliance.

The word "pin" as used herein is intended to include comparatively elongate cylindrical terminals whether hollow or solid.

Thus, the appliance has a male connector for engagement with a female connector associated with the base unit. When the female connector is connected to the electrical supply, the appliance may be energised by placing it upon the base unit in any rotary position.

Such connectors are believed to be a new departure and therefore from a third aspect the invention provides a male and female connector in or for a cordless appliance, the connectors being capable of engagement in any relative rotational orientation, the male connector having a terminal in the form of a central pin and an annular terminal concentric therewith.

In many appliances it will be desirable to provide an earth connection, and therefore preferably a third terminal is provided on the appliance and a further terminal is provided on the base unit for co-operation therewith. Clearly, the third terminal should be arranged such that it too forms a sound electrical connection to the base at any angular orientation of appliance and base. One way to achieve this is to provide the third terminal on the appliance in the form of an annulus around the other terminals and thus the male connector may comprise a series of concentric terminals: a central pin surrounded by two concentric annular terminals, these constituting the live, neutral and earth terminals of the connector.

With this arrangement the terminals of the male connector engage with contacts, for example leaf spring contacts, provided in the female socket connector in the base unit. In the arrangement described above with three concentric terminals, the central pin and inner annular terminal may be received in openings formed in the forward end of the socket connector to engage with respective contacts arranged within the socket connector, while the outer annular terminal may be received about an outer wall of the socket connector, to engage with a contact in the outer wall thereof.

The earth terminal may, however, take a different form. For example, an annular earth terminal could be provided on the female connector, in which case a simple leaf spring or leaf spring mounted contact could be provided on the male connector. The connectors discussed above are, in themselves a new departure in respect of electrical connectors which may be applied to cordless appliances in general, and from a fourth aspect, therefore, the invention provides an electrical connector in or for cordless electrical appliance comprising a male connector and a female socket connector for engagement therewith, said male connector comprising a central conducting pin terminal, and an annular terminal concentric with the pin terminal said female socket connector having openings in the forward end thereof for receiving the central pin terminal and the annular terminal of the male connector, the socket connector having electrical contact means for engaging with said terminals of said male connector.

Preferably the socket connector has an outer circumferential surface for engagement within an outer circumferential surface of the male connector.

As described above, in one embodiment, an earth contact of the socket connector may be formed to extend through a side wall of the socket connector which defines an outer circumferential surface for engagement with an outer annular earth terminal of the male connector. The earth contact may be exposed, since it does not carry current and is therefore safe to users.

Alternatively, the earth contact in the socket connector may take the form of an annular terminal, most preferably an annular conductor provided on the outer circumferential surface of the female connector for engagement with an earth contact formed on the male connector which may be formed as a leaf spring or leaf spring mounted contact extending through the circumferential wall of the male connector. This arrangement has the advantage that the integrity of the earth connection is improved. In the earlier described arrangement where the socket connector has a spring contact extending through a side wall thereof, the earth contact is accessible by a user. If the contact is interfered with, the spring force of the spring may be diminished, leading to a reduction of the earth connection contact force. This is obviated where the socket earth contact is an annular terminal, which cannot be deflected. Furthermore an annular earth contact on the socket has considerable aesthetic appeal to a user.

It is believed that this arrangement is also a new and advantageous construction, and therefore, from a fifth aspect the invention provides male and female connectors in or for a cordless appliance, wherein the connectors are capable of making electrical connection irrespective of the relative angular orientation of the connectors and the female connector has an annular earth terminal provided on an exposed outer circumferential surface thereof.

The annular terminal may extend over a section only of the height of the socket wall, but preferably it extends substantially over the entire height of the wall.

Preferably the earth terminal is formed from a material which is attractive as well as being electrically conducting and also corrosion resistant. Although silver fulfils these requirements, stainless steel is preferred for its higher strength and lower cost.

In preferred embodiments of the invention the male terminals and socket contacts are arranged such that the live, neutral and earth connections are made and broken sequentially. Preferably the earth connection is made first and broken last, so that the appliance is earthed as it is placed on the base unit and remains so until it is removed from the base unit, so that it is earthed at any time that power may be supplied to it. The live and neutral connections are then made and broken sequentially. This has the effect that the electrical supply to the appliance is always made and broken at one contact, which means that arcing can be restricted to that contact. As such it is only necessary to provide substantial contact surfaces at one interface. In certain embodiments, the central pin terminal is arranged to connect last, and so it is provided with a contact, for example a silver contact, at its lower end, for engagement with a leaf spring mounted contact in the socket connector. Such an arrangement obviates the need for providing an arc-resistant contact surface such as a thick silver plating on the lower edge of the annular terminal, and for a separate contact in the socket connector, such that the annular terminal may engage directly with a conductive leaf spring, for example. Alternatively, the annular terminal may connect last, in which case it should preferably be silver plated, at least in the regions where contact is made. In such arrangements there is no need to provide a silver contact on the pin, which represents a significant cost saving.

Preferably the male connector is provided with guide means which cooperate with the socket connector to align the terminals with the openings therein. The guide means preferably comprises an inwardly facing annular guide surface of the male connector, which engages closely with the forward edge of the side wall of the socket connector, the side wall being recessed with respect to its forward edge to allow the male connector to pivot by a limited amount relative to the socket connector. In this way, the male terminals may be guided accurately into their receiving openings by the interengagement of the guide surface of the male connector and the forward edge of the socket side wall. This means that the size of the openings can be minimised, which is advantageous in that it prevents foreign objects from being inserted the therethrough, which obviates the need for shutters on the openings which could substantially complicate the design.

Such a guidance arrangement need not be limited to the particular configuration of pin and annular terminals described above, and from a sixth aspect, therefore, the invention provides an electrical connector comprising a male connector and a female socket connector for engagement therewith, the male connector comprising a plurality of concentric terminals engaging in respective openings formed in the forward end of the socket connector, the male connector having an inwardly facing circumferential guide surface engaging over an outer circumferential wall of the socket connector, the guide surface engaging closely with the forward edge of the outer wall of the socket connector, the outer wall being recessed with respect to its forward edge to permit limited pivotal movement of the male connector- with respect to the socket connector whilst maintaining alignment of the terminals and openings in the plane of said forward edge.

It may also be possible, instead to recess the guide surface of the male connector with respect to its forward end, rather than the socket wall, and such arrangements are also intended to fall within this aspect of the invention.

The plurality of concentric terminals in the male connector may comprise a central pin and a single annular terminal disposed therearound. It may also comprise a further terminal, eg. an earth terminal, which, as discussed previously, may also be annular and arranged concentrically around the control pin.

In a preferred arrangement, one of the terminals of the male connector may be thus provided on or constitute the guide surface of the male connector. This gives a particularly compact arrangement, and provides good support for the terminal.

Tapering guide surfaces may be provided at the lower edges of the guide surface of the male connector and the outer wall of the socket connector. By doing this, the initial alignment of appliance with base unit can be made much easier than would otherwise be the case. Typically, the guide surfaces should be around 5 or 10 minutes wide as since most consumers have little trouble in placing an appliance within 5 or 10 mm of its correct position on a base unit. Of course larger guide surfaces would be provided, but this tends to make the connectors unnecessarily large.

It is believed that such guide surface are applicable to other forms of connector, and therefore, from a seventh aspect the invention provides a male and female connector in or for a cordless appliance, wherein the connectors are capable of making electrical connection irrespective of their relative angular orientation, wherein tapering guide surfaces are provided which serve to align the connectors before engagement is made therebetween.

Preferably, a male terminal with tapered guide surfaces is provided in combination with a female connector having side walls recessed with respect to a forward edge thereof, as discussed previously. This allows for particularly accurate alignment of the appliance and base unit, and, as discussed previously, obviates the need for shutters on the openings in the female connector.

The avoidance of the need for a shutter is advantageous in itself, and thus, from an eighth aspect of the invention there is provided an electrical connector in/or an cordless electrical appliance comprising a male and a female socket connector for engagement in or for a cordless appliance, the male terminal having a pin terminal and a concentric annular terminal which are arranged to engage in corresponding openings within the female connector, wherein the openings are configured such that the need for a shutter is obviated.

As will be clear from the foregoing, the need for a shutter may most preferably be obviated by making any openings in the socket connector within which male terminals are received too small to insert foreign bodies. Preferably, they are less than 3 mm wide so that a 3 mm test finger cannot be inserted into the openings, as required by electrical safety standards. The use of such small openings is facilitated in the present invention by the use of pin and annular terminals in the male connector part, and also with the use of guide means, as discussed above.

Although certain connectors discussed above do not require shutters for reasons of electrical safety, it may still be desirable to provide shutters for aesthetic reasons, and therefore connectors as discussed above may be provided with shutters.

Connectors as described above may be applied to many cordless appliances e.g. cordless irons although it is presently envisaged that they are particularly appropriate for use in cordless hot water containers such as jugs, as previously described.

Certain embodiments of the invention will now be described, by way of example only, with reference to the accompanying drawings of which:

FIG. 1 is a schematic cross sectional view of a cordless hot water jug embodying the invention in which the vessel is located on its base unit;

FIG. 2 corresponds to FIG. 1, but with the vessel only partially located in position on the base unit;

Figure 1:
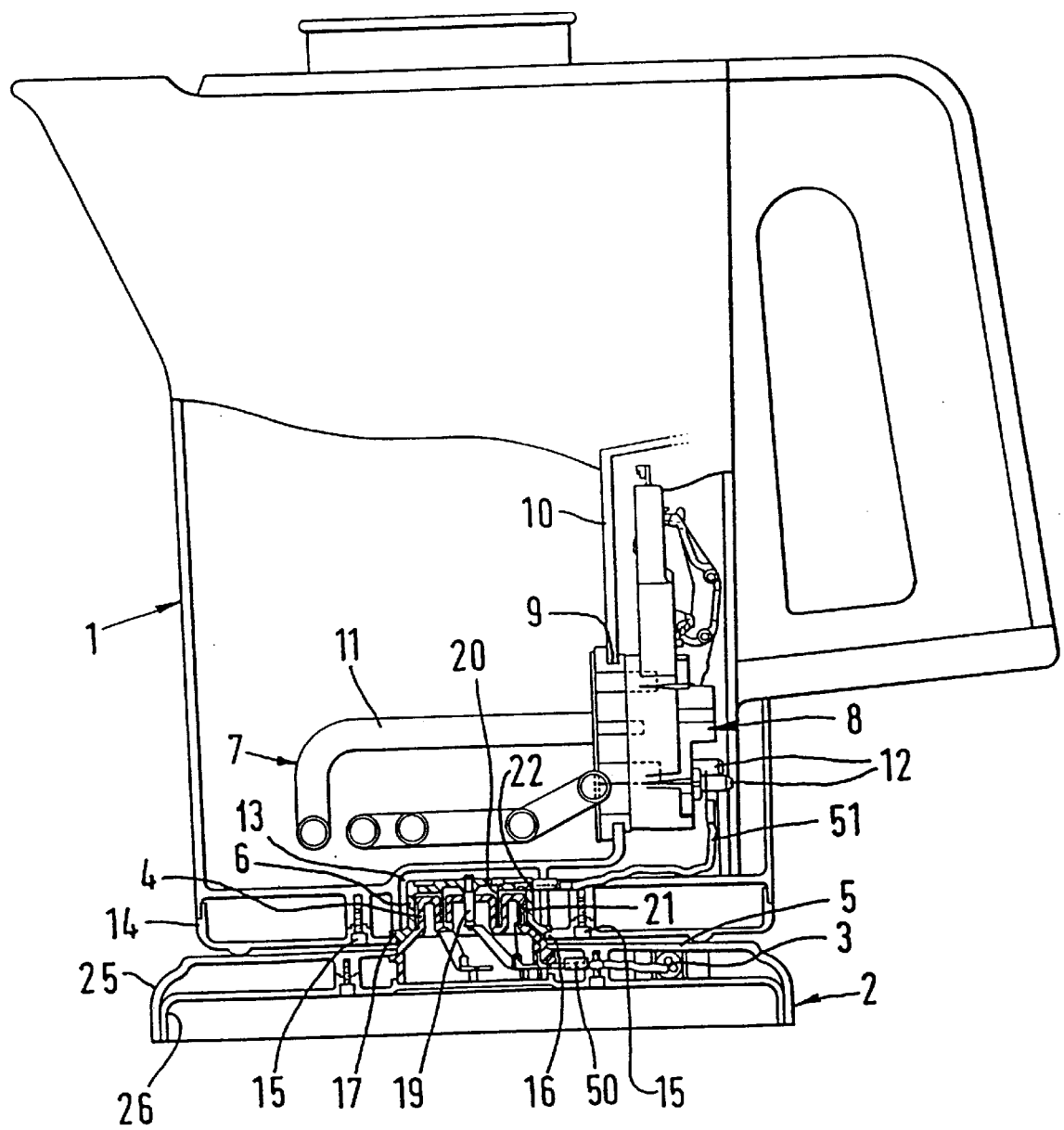

Referring firstly to FIG. 1 a cordless hot water jug is illustrated. This comprises two portions, a plastics jug 1 and a base unit 2. The base unit 2 is connected to a source of electrical power through a lead 3, and has a socket connector 4 provided on its upper surface 5, for engagement with a male connector 6 provided on the jug 1.

The jug 1 houses an electrical immersion heater 7, which together with its associated control unit 8 is mounted, in a conventional manner, in an opening 9 in the side wall 10 of the jug 1.

The control unit 8 is of a known type, such as described in UK Patent 2181598 and acts to interrupt the power supply to the element 11 of the heater in the event of water boiling in the jug, or the element overheating.

The configuration of the jug, as discussed above, is generally similar to that of the traditional, non-cordless design. In a traditional jug or kettle, the horizontally extending terminal pins 12 of the control unit would engage with a socket connector to which a mains lead is attached through a suitable opening in the outer body of the jug 1.

Figure 2:
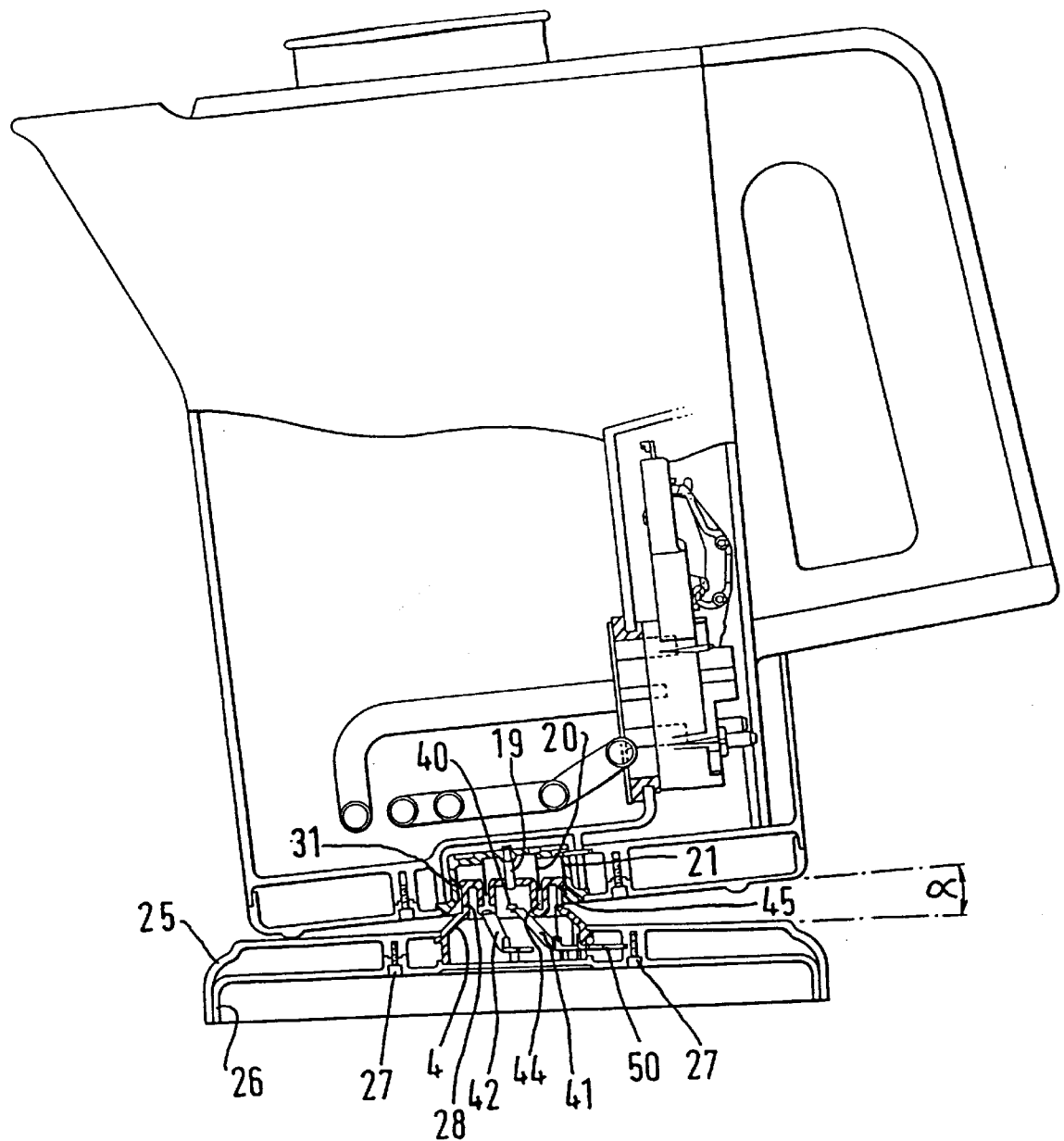
Figure 3:
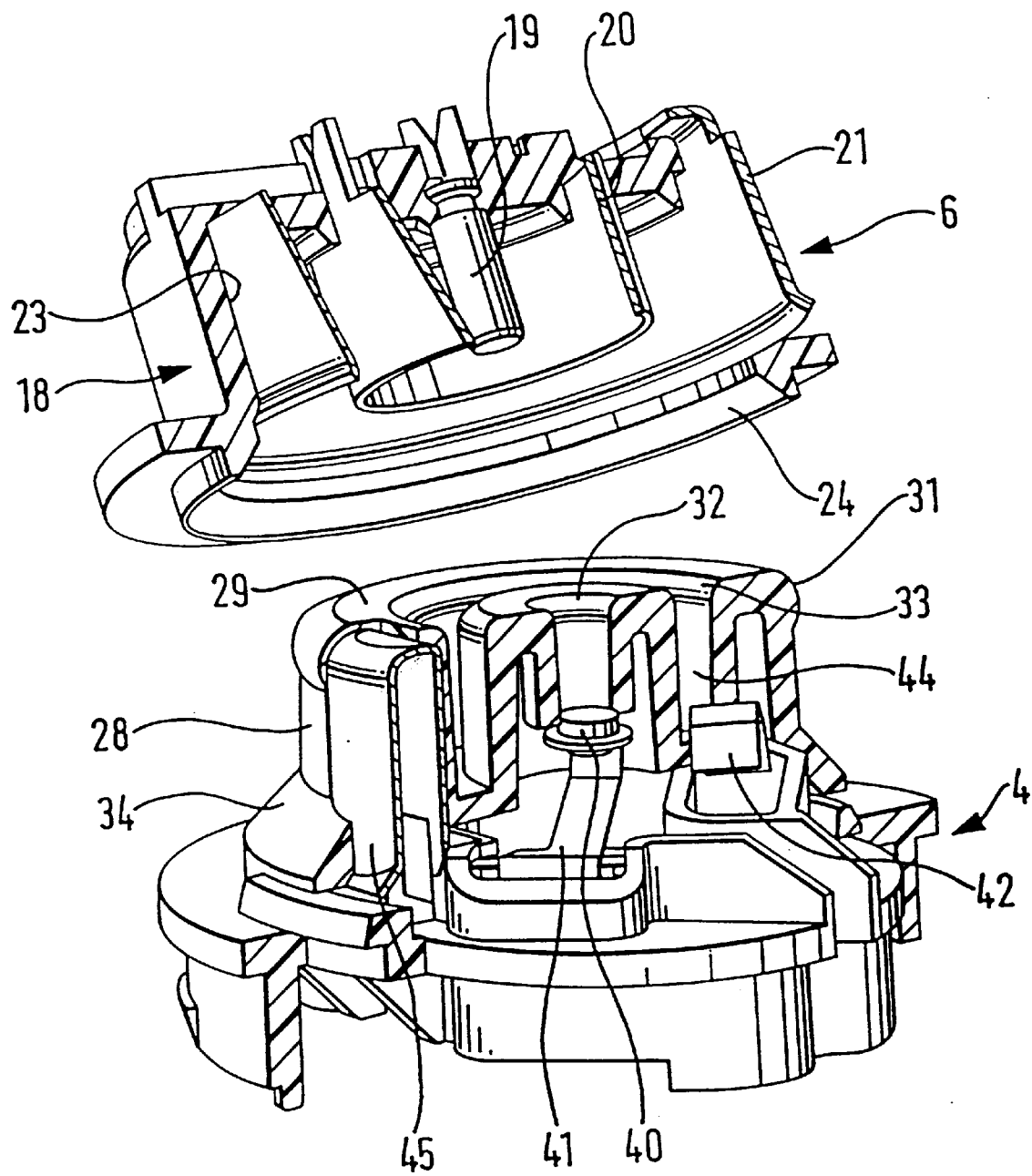
FIG. 3 shows a partly cut away perspective view of a connector in accordance with the invention.

In the illustrated jug, however, electrical power is supplied to the jug through the base unit 2, through the male and socket connectors 6 and 4 respectively. The connector shown in FIGS. 1 and 2 is generally similar to that shown in FIG. 3, apart from the contact arrangement, and reference may be made to all three figures to better understand the connector construction. Common numerals have been used in the figures to facilitate this.

The male connector 6 is located in a recess 13 generally centrally in the base of the jug 1. The recess 13 is formed in the moulding which forms the major part of the jug 1, the male connector being retained in position by a cover 14 which is screwed onto the bottom of the moulding by screws 15. The cover 14 forms the outer base of the jug 1 and has an opening 16 which locates around flange 17 provided on the lower edge of the male connector, thereby holding the connector in position.

The male connector 6 has a moulded plastics body 18 (FIG. 3) having a generally inverted cup-like shape. A terminal pin 19 projects centrally downwardly into the cup. This pin 19 is connected, at its upper end, to a spade terminal (not shown). Concentric with the pin is an inner annular terminal 20 of a thin conducting material such as copper. This is connected in turn at its upper end to a second spade terminal, (not shown). Finally, around the inside surface 23 of the body 18 of the connector is provided an outer annular terminal 21, attached to a third spade terminal 22. It will thus be seen that there are three electrical terminals which are concentric and rotationally symmetrical about the centre of the connector 6. The respective spade connectors of the terminals are electrically connected to the respective terminal pins 12 of the control unit by respective leads 51 running underneath the base of the jug. FIG. 1 illustrates one such lead linking the outer annular terminal 21 to the earth pin of the control unit 8. Similar leads will connect the central pin 19 to the live terminal pin of the control unit 8 and the inner annular terminal 20 to the neutral terminal pin of the control unit 8.

The lower part 24 of the inwardly facing surface of the male connector is tapered to provide a lead in to the connector to assist in mating with the female connector 4.

The corresponding female socket connector 4 is mounted to the upper surface of the base unit 2 so as to project therefrom. The base unit 2 consists of an upper moulding 25 into which the socket connector 4 is inserted from below and a lower moulding 26 which fits inside the moulding 25 from beneath, clamping the socket connector 4 in position with screws 27.

The socket connector 4 is of moulded plastics, and has an insulating body having an upper cylindrical portion 28 with a closed forward end 29 having respective circular and annular openings 32,33 which are provided to receive the pin 19 and inner annular terminal 20 of the male connector 6. These openings are all less than 3 mm wide to prevent access to electrically live components within.

The outer wall of the cylindrical portion 28 is formed at its forward edge with a lip 31 which fits closely within the outer annular terminal 21 provided on the inwardly facing surface 23 of the male connector 6. Thus the remainder of the cylindrical portion 28 is inwardly recessed below the lip 31. As can be seen from FIG. 2, such an arrangement allows the male connector 6 to be engaged on the socket connector 4 at a slight angler but while still maintaining accurate registration of the pin 19 and inner terminal 20 with respect to the openings 32,33 in the plane of the forward end 29 of the socket connector. The openings 32,33 are tapered at their upper ends to give clearance to the terminals 19,20 as they enter the openings 32,33. Beneath the cylindrical portion 28 is a tapered portion which cooperates with the tapered part 24 of the male connector 6, to provide snug mating engagement of the connectors. The interengagement of the tapering portions acts to urge the male connector 6 into a vertical orientation when it is fully engaged with the socket connector 4.

The socket connector 4 houses electrical contacts which cooperate with the corresponding terminals 19,20, 21 of the male connector 6. A first leaf spring 41 mounted contact 40 is arranged beneath the central opening 32 in the centre of the female connector 4 and in use engages with the pin 19. A second spring contact 42 is located under an opening in the bottom of the annular groove 44 which receives the inner annular terminal 20 of the male connector 6. Finally, a third, vertically oriented leaf spring contact 45 is arranged to project through the outer side wall of the cylindrical portion 28 of the socket connector 4 in order to connect with the outer annular terminal of the male connector 6.

The third contact 45 is the earth contact and is arranged to be near to or extend towards the forward end 29 of the socket connector 4 in order that it always makes connection before the other two contacts 40,42. This is advisable for safety reasons in that the jug 1 is earthed before it is supplied with current.

It will be seen from FIG. 2 that the connectors are constructed such that the inner annular terminal 20 and the spring contact 42 will connect before the pin 19 and the contact 40. This is so that electrical contact between the jug and the base will always be initially made and broken at the interface between the latter. To avoid arcing which may occur at this interface, it is therefore necessary to provide substantial contact surfaces on the lower end of the pin 19, and, as shown, on the leaf spring 41. However, no such contact surfaces need be provided on the inner annular terminal 20 or the leaf spring 42 since no arc will be created across their interface.

Each of the contacts in the socket connector 4 is provided with a spade terminal 50 which are used to provide connection to the mains cable 3. The central contact 40 is preferably connected to the line side of the supply and the contact 42 to the neutral side.

As mentioned above, the connectors shown in FIGS. 1 and 2 and FIG. 3 are substantially similar, having minor differences in layout, but operate in substantially the same way. The most notable differences between the two are in the specific arrangement of the contacts in the socket connector 4.

FIG. 1 shows the jug and base unit in position ready for use. It will be noted that the male connector fits snugly around the lip 31 provided at the forward edge 29 of the cylindrical portion 28 of the female connector. In this position the power is supplied through the connector to the wires (only one shown for purposes of clarity) to the control unit 8. In order to remove the jug, for example, to fill it with water, it is necessary only to lift the jug in a substantially vertical direction.

Once the jug has been refilled with water it is then replaced on the base before use. Because of the rotationally symmetrical nature of the electrical connectors 4 and 6, the relative angular positions of the jug and base unit are not important, and the jug may be placed on the base at any angle.

In addition, as will be seen from FIG. 2, if the jug 1 is not placed on the base in a near vertical orientation, the bottom of the jug 1 will come into contact with a portion of the base unit 2 before the connectors come into contact, and if the angle between the jug and base is large, will produce a pivoting action around the point of contact before the connectors touch. The tapering portion 24 at the lower end of the male connector 6 will act approximately to align the connectors 4,6. The inner guide surface provided by the inner surface of terminal 21 will then engage with the lip 31 provided around the forward edge 29 of the socket connector so as to ensure accurate alignment between the terminals 19,20 and openings 32,33 in the plane of the forward edge. At the same time, the recess below the lip 31 accommodates a degree of pivoting of the jug relative to the base unit up to the maximum permitted engagement angle α (typically around 4°) between the two at which peripheral regions of the jug and base unit engage and the terminals 19,20 just enter the openings 32,33 as shown in FIG. 2. As the male connector 6 moves downwardly, the earth connection is made first, then the neutral then the live, at which point power is supplied to the jug.

Figure 4:
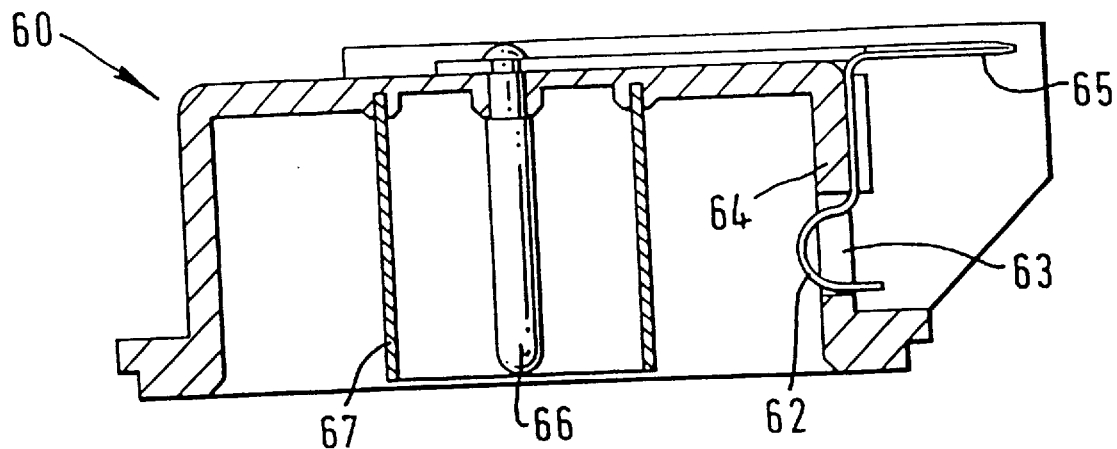
FIG. 4 is a sectional view of an alternative embodiment of male connector.
Figure 5:
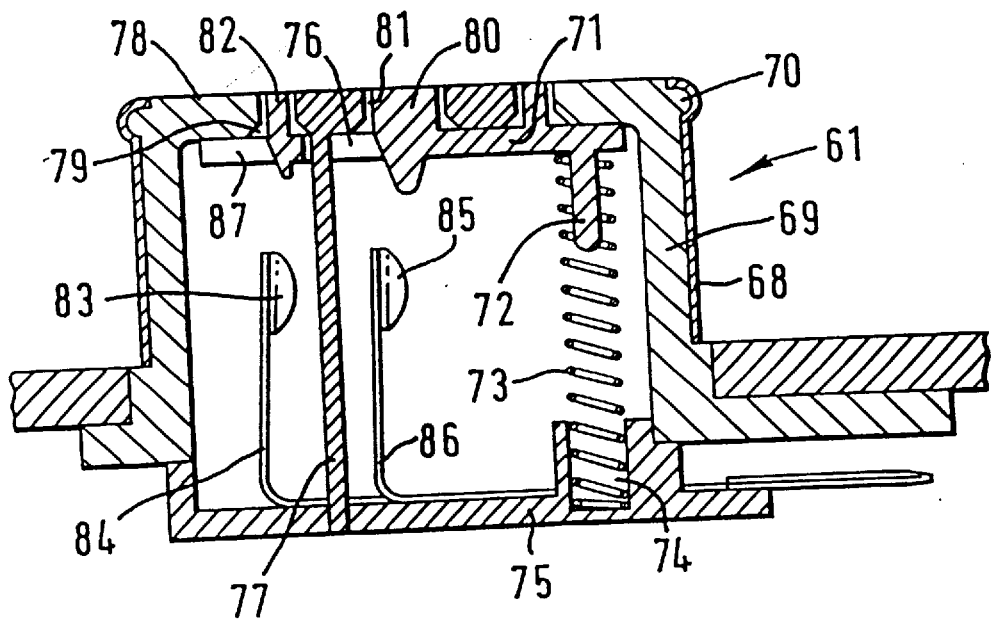
FIG. 5 is a sectional view of a female connector for cooperation with the male connector of FIG. 4.
Figure 6:
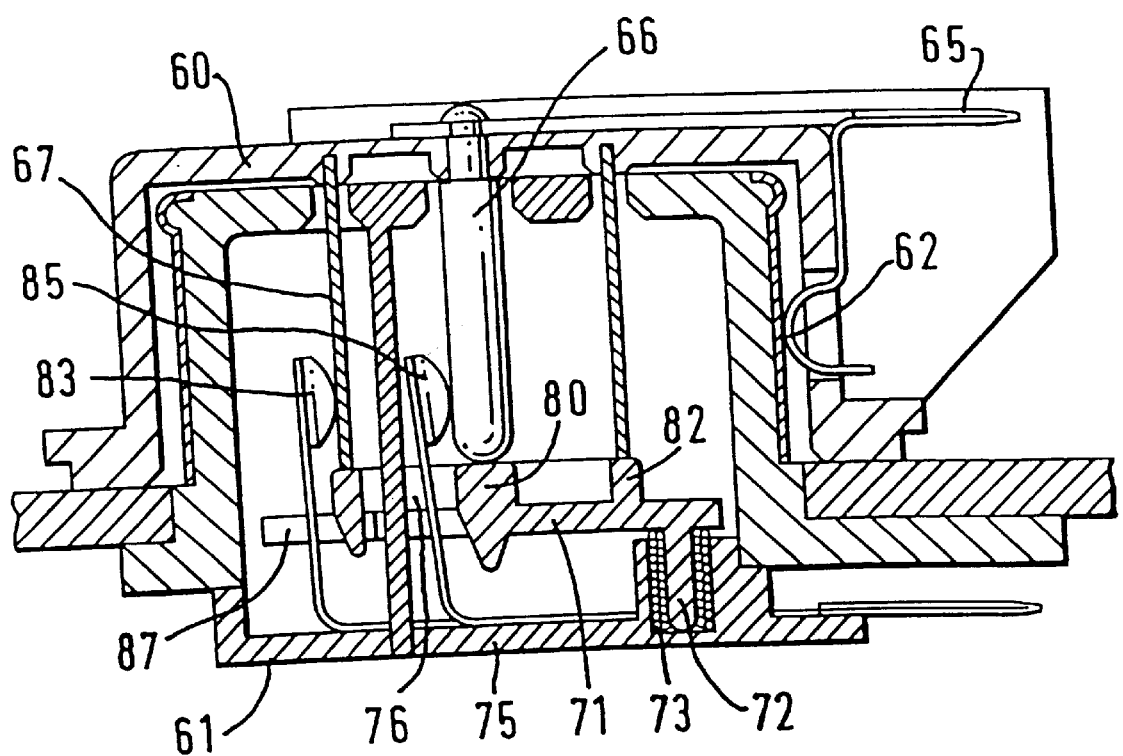
FIG. 6 is a sectional view of the connectors of FIGS. 4 and 5 mated together.

FIGS. 4 to 6 illustrate an alternative embodiment of male and female connectors 60,61 which may be mounted in a jug and base unit in place of those previously described.

The male connector 60, which in use would be mounted into the bottom of a jug, is generally similar to male connector 6, except that instead of having an annular earth terminal around its inside surface, a leaf spring contact 62 projects through an opening 63 in the outer wall 64 of the connector body. The leaf spring 62 is formed integrally with a spade terminal 64 which projects from the upper part of the connector body. The central terminal pin 66 (live) and annular terminal 61 (neutral) are arranged generally as in the previous embodiment.

The female connector 61 has a generally similar configuration to female connector 4, but is modified in certain significant respects in order to provide shuttering to the live and neutral terminals and an improved earth connection arrangement. However, as the openings in this embodiment are of a similar size to those of the previous embodiment, the shutter is not essential for the safe operation of the connector.

The earth connection is provided by means of an annular terminal 68 formed from stainless steel disposed around the outer walls 69 of the female connector 61. This provides a stronger earth terminal since the use of a comparatively fragile exposed leaf spring is avoided. It is also considered that the annulus of stainless steel is more aesthetically pleasing to the consumer.

It will be noted that the annular terminal extends over the lip 70 the uppermost part of the female connector in order to ensure that when the male connector 60 is mated with the female connector 61, connection between the earth terminals 62,68 is made before connection between the other terminals.

Within the body of the female connector 61 there is provided a generally disc-shaped shutter 71. The upper face of the shutter 71 has a central projection 80 which corresponds to the central opening 81 in the upper face 78 of the female connector 61, and a concentric annular projection which corresponds to the annular opening 79. The shutter 71 also has a downwardly projecting pin 72, around which is located a coil spring 73 which is in turn received within an opening 74 formed in the base 75 of the female connector. This spring serves to bias the shutter carrier upwardly against the bottom of the upper part of the connector. The shutter 71 has an opening provided diametrically opposite the pin 72. This is loosely engaged around guide post 77 which extends from the base 75 to the upper part of the female connector. It will be noted that, unlike the previously described female connector 4, this embodiment has no parts projecting downwardly from the sides of annular opening 79 as these would obstruct the shutter 71. Thus, the shutter 71 is free to move in the vertical direction, guided by guide post 77.

When the female connector is separated from the male connector, as shown in FIG. 5, the spring is able to bias the shutter 71 into its uppermost condition. Here, the central projection is received within the central opening 81 and the annular projection 80 is received within the annular opening 79. As may be seen from that figure, the projections are dimensioned to be flush with the upper face 78. When the connectors are mated as shown in FIG. 6, the terminal pin 66 and the annular terminal 67 depress the shutter 71 which enables them to enter the female connector.

In order to accommodate the shutter carrier, the arrangement of the live and neutral terminals is also modified compared to the previous embodiment so that they act on the vertically extending surfaces of the male connector terminals. The outer contact 83 is mounted on a leaf spring 84 which extends vertically through a cut-away 87 in the shutter carrier. The other end of the leaf spring 84 terminates in a spade terminal 88. Inner contact 85 is likewise mounted on a vertically extending leaf spring and this leaf spring passes through opening 76 in the shutter carrier 71. Both leaf springs are arranged to bias their respective contacts against the corresponding male terminal when the connectors are mated.

Thus, when the connectors are brought together, for example when a water heating jug having a male connector 60 is placed onto a base unit having a female connector 61, the lowermost parts of the live and neutral terminals on the male connector abut and then depress the shutter 71. Next, the male connector earth terminal, leaf spring contact 62, engages the annular terminal 68 on the female connector and maintains engagement therewith as the connectors are fully engaged, bringing first the neutral and then the live terminals into engagement.

Whilst the invention has been described above with reference to a jug connector, it will be appreciated that the connector of the invention is not limited to such application, but may also be suitable for other cordless appliances such as irons etc.

What is claimed is:

1. A cordless electrical liquid water heating appliance comprising a cordless electrical power connector, the connector comprising:

a male connector part including a first terminal, a second terminal arranged outwardly of the first terminal, and a third terminal arranged outwardly of the second terminal; and a female connector part capable of receiving the male connector part and including terminals for engaging with the corresponding terminals of the male connector, thereby forming respective radially innermost, radially intermediate, and radially outermost terminal pairs, the radially outermost terminal pair comprising:

an annular terminal with an inwardly facing contact surface provided on one of the connector parts; and a resilient electrical terminal projecting through an outwardly facing circumferential surface of the other connector part for engagement with the annular terminal when the two connector parts are assembled together, wherein the male and female connector are configured so as to be capable of engagement in any relative rotational orientation.

2. A cordless electrical liquid heating appliance as claimed in claim 1, wherein the radially innermost terminal pair comprises:

a central terminal pin provided in one connector part; and a resilient electrical contact in the other connector part.

3. A cordless electrical liquid heating appliance as claimed in claim 1 or claim 2, wherein the radially intermediate terminal pair comprises an annular contact surface on one of the connector parts.

4. A cordless electrical liquid heating appliance as claimed in claim 1, wherein the radially outermost terminal pair constitutes an earth connection between the connector parts.

5. A cordless electrical liquid heating appliance as claimed in claim 2, wherein the radially outermost terminal pair constitutes an earth connection between the connector parts.

6. A cordless electrical liquid heating appliance as claimed in claim 3, wherein the radially outermost terminal pair constitutes an earth connection between the connector parts.

7. A cordless electrical liquid heating appliance as claimed in claim 6, wherein the earth connection is made first and broken last as the connector parts are engaged and disengaged.

8. A cordless electrical liquid heating appliance as claimed in claim 1, wherein the male connector part is provided with guide means which cooperate with the female connector part to align the terminal of the male connector with the openings in the socket connector.

9. A cordless electrical liquid heating appliance as claimed in claim 8, wherein the guide means comprises an inwardly facing annular guide surface of the male connector part, which engages closely with a forward edge of a side wall of the female connector part, the side wall being recessed with respect to its forward edge to allow the male connector part to pivot by a limited amount relative to the socket connector.

10. A cordless electrical liquid heating appliance as claimed in claim 9, wherein the guide means further comprises tapered guide surfaces at lower edges of the guide surface of the male connector part.

11. A cordless electrical liquid heating appliance as claimed in claim 1, further comprising a shutter in the female connector part to cover openings therein when the female connector part is separated from the male connector part.

12. A cordless electrical liquid heating appliance as claimed in claim 1, wherein openings in the female connector part for receiving terminals of the male connector part are less than 3 mm wide.

13. A cordless electrical liquid heating appliance as claimed in claim 4, wherein the annular terminal of the radially outermost terminal pair is provided on the male connector part, the male connector part being mounted to the appliance.

* * * * *